Feb. 19, 1924.
R. F. METCALFE
1,484,185
SPEED SENSITIVE CONTROLLING DEVICE
Filed Oct. 27, 1919
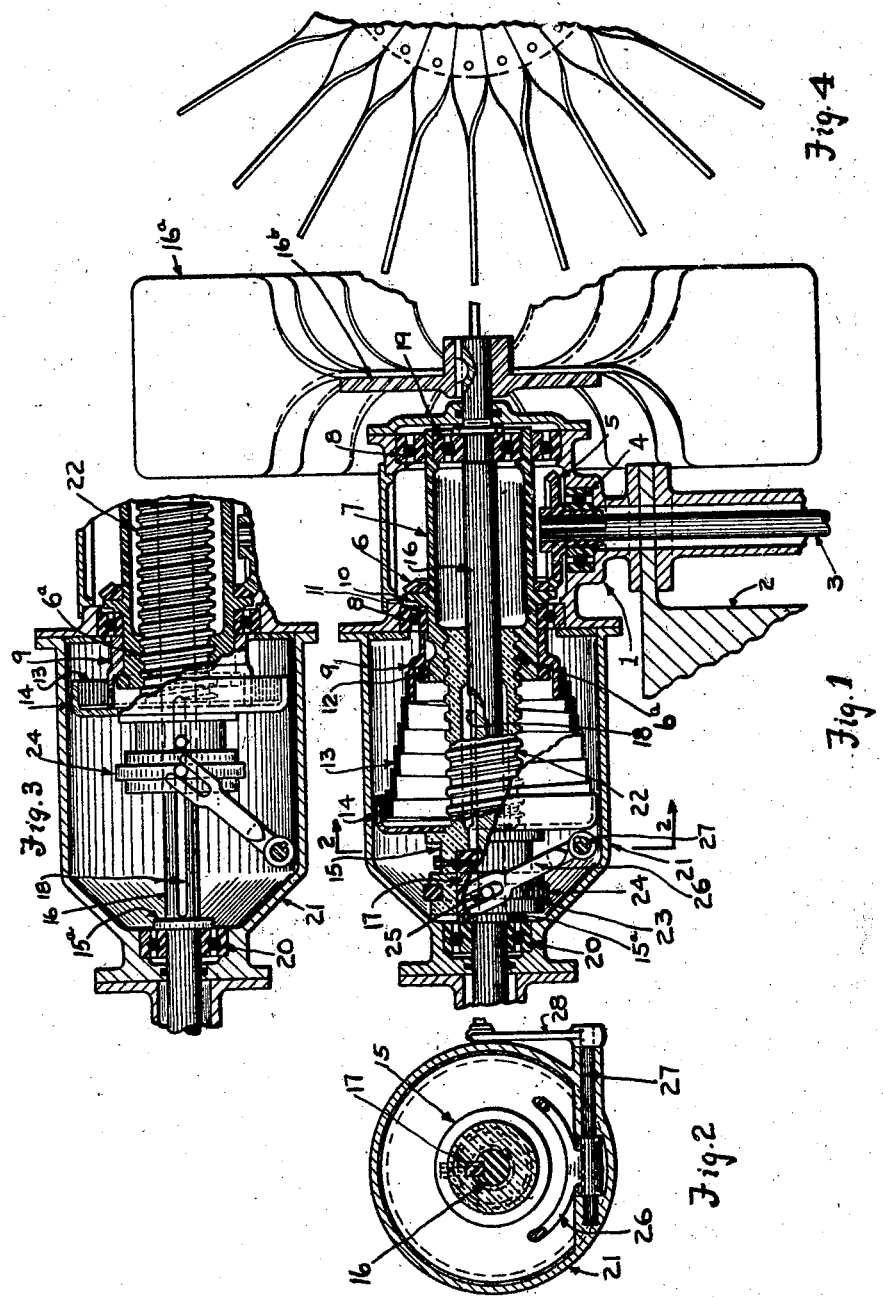
Inventor
Robert F. Metcalfe
By *illegible*
Attorney Patented Feb. 19, 1924.

1,484,185

UNITED STATES PATENT OFFICE.

ROBERT F. METCALFE, OF ERIE, PENNSYLVANIA, ASSIGNOR TO SKINNER PATENT HOLDING COMPANY, OF ERIE, PENNSYLVANIA, A CORPORATION OF PENNSYLVANIA.

SPEED-SENSITIVE CONTROLLING DEVICE.

Application filed October 27, 1919. Serial No. 333,793.

*To all whom it may concern:*

Be it known that I, ROBERT F. METCALFE, a citizen of the United States, residing at Erie, in the county of Erie and State of Pennsylvania, have invented new and useful Improvements in Speed-Sensitive Controlling Devices, of which the following is a specification.

The invention is particularly designed for controlling certain operations of motors which operations are not what are ordinarily termed a governing operation. The device broadly speaking, however, is capable of acting as a speed governor.

The invention is illustrated in the accompanying drawings as follows:—

Fig. 1 shows a central section of the device.

Fig. 2 a section on the line 2—2 in Fig. 1.

Fig. 3 a section of a fragment of the parts shown in Fig. 1 with a different position of the mechanism.

Fig. 4 a front elevation of a portion of the resisting fan.

1 marks the frame, 2 a portion of a mounting ordinarily a part of the engine bed, and 3 a drive shaft ordinarily getting its motion from a device to be controlled such as an engine. The shaft 3 is journaled in bearings 4 in the frame. It is provided with a bevelled pinion 5 at its upper end driving a bevelled pinion 6. The bevelled pinion 6 is mounted on a sleeve-shaped driving shaft 7. The shaft 7 is mounted in bearings 8 in the frame 1. A spring driving head 9 is fixed on the shaft 7. A convenient manner of mounting it is to provide the shaft 7 with a shoulder 10 against which the inner ring 11 of the bearing 8 abuts. The inner hub of the spring driving head 9 is clamped between the ring 11 and a clamp nut 12 on the end of the shaft 7.

A spring 13 is secured to the head 9. It is preferably formed of flat spring material and wound so that the coils will nest one within the other. The larger end of the spring is secured to a driven head 14 which is fixed on a sliding head 15. The head 15 is slidingly mounted on a shaft 16. A spline 17 is secured in the head 15 and operates in a groove 18 in the shaft, thus locking the head 15 against rotation on the shaft 16 but permitting it to slide thereon. The shaft 16 is carried by the bearing 19 within the shaft 7 and a bearing 20 is arranged in the extension 21 of the frame 1. A screw 22 projects from the head 15 along the shaft 16 and is engaged by a nut $6^a$ in the shaft 7.

The operation of the device so far as described is as follows:—Motion is given to the shaft 7 from the shaft 3. This motion is communicated to the shaft 16 through the spring 13. The rotary motion of the shaft 16 is resisted by the fan $16^a$ mounted on the flange $16^b$. Inasmuch as the driving of the fan is accomplished through the spring 13 the resistance of the fan is communicated to the spring and as this resistance increases a point is reached where the spring yields and under these conditions the shaft 7 has a rotative motion relatively to the head 15 and shaft 16. This relative rotative movement is made use of through the action of the screw 22 in the nut $6^a$. It will be observed that when this rotation takes place the screw 22 is moved axially through the action of the screw and this axial movement may be utilized for controlling the driving mechanism or other device as desired. As the drive shaft is given any particular speed this speed is necessarily communicated to the fan and is accompanied by a certain resistance. This resistance is communicated through the spring and the spring yields to a certain extent corresponding to this resistance. Consequently a certain speed will be accompanied by a definite position of the head 15.

It is preferable in most cases to give to the spring a certain initial tension and this is accomplished by limiting the outward movement of the head. As soon as the head reaches the stop $15^a$ no further rotative movement between the sleeve 7 and the head 15 can take place and consequently the unwinding of the spring is limited to this position. This may be set at any point desired in the assembling of the device.

It is also preferable to limit the extent to which the spring may be rotated inasmuch as at very high speeds the resistance of the fan may be such as to unduly strain the spring. This is accomplished in the present instance by the contact of the driven head 14 with the spring driving head 9 as clearly shown in Fig. 3. After this engagement takes place no added strain can be delivered to the spring.

In order to communicate the axial movement of the head 15 to a device to be controlled I provide the groove 23 in the head 15 in which is arranged a collar 24. It is provided with the usual projecting pins 25 which extend into slots in the forked arm 26. The forked arm is fixed on a shaft 27. The shaft 27 extends without the case formed by the extension 21 and is provided with an arm 28 which forms a means for communicating the movement of the controlling device. This forms a very sensitive yet very positive control and one which is capable of sustaining a high speed outside of the range of the governing action. In some devices this is very desirable, in fact, necessary. For this reason the fan is preferable to centrifugal weights or similar devices where excessive speed might be dangerous.

What I claim as new is:—

In a speed sensitive controlling device, the combination of a fan; a driven shaft on which the fan is mounted; bearings for said shaft; an externally screw-threaded sleeve slidingly mounted on the shaft; a driving shaft within which the driven shaft extends; a screw on the driving shaft over the sleeve screw on the driven shaft; a spring connection between said driving shaft and driven shaft; and means for communicating the movement of the device from the screw-threaded sleeve.

In testimony whereof I have hereunto set my hand.

ROBERT F. METCALFE.